Figure 1:
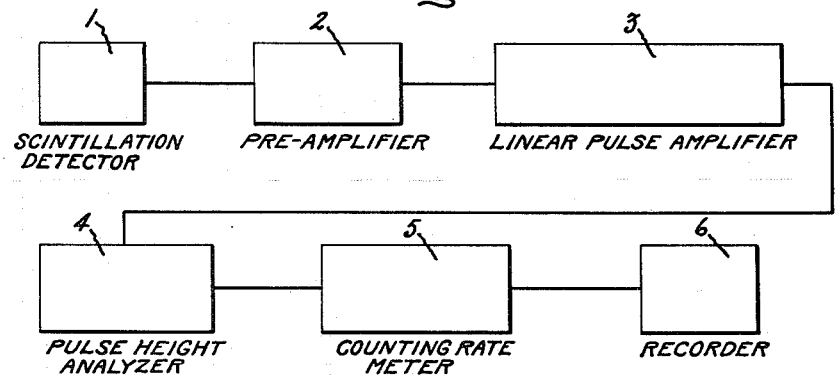

June 18, 1963  W. W. SCHULTZ  3,094,621
IDENTIFYING PLANT AND ANIMAL DEFICIENCIES BY RADIOACTIVE MEANS
Filed April 24, 1959

Inventor:
Warner W. Schultz,
by J. David Blumenfeld
His Attorney.

3,094,621
IDENTIFYING PLANT AND ANIMAL DEFICIENCIES BY RADIOACTIVE MEANS
Warner W. Schultz, Schenectady, N.Y., assignor to General Electric Company, a corporation of New York
Filed Apr. 24, 1959, Ser. No. 808,661
3 Claims. (Cl. 250—83.3)

This application is a continuation-in-part of my co-pending application Serial No. 544,180, filed November 1, 1955, now abandoned, and assigned to the same assignee as the present invention.

This invention relates to a method for determining element deficiencies in vegetable and animal matter, and more specifically one for determining by use of radioactive techniques how effectively the plant absorbs and distributes such elements.

It is a well known fact that most plants require certain trace elements such as boron, zinc, manganese, copper, iron, and molybdenum as well as slightly larger quantities of other elements such as magnesium, nitrogen, potassium, phosphorous, calcium, etc., to thrive. In the past, it has been common to use visual inspection of plant characteristics such as leaf structure, the leaf coloring, terminal die back, etc., to ascertain what element deficiencies exist. It is clear, however, that such visual inspection is far from satisfactory since it is difficult to correlate with any accuracy and consistency the relationship between these visual indicia and the element deficiencies, particularly since other factors such as fungi, insects, water supply, etc., may also have a bearing on their production. Furthermore, even if any of these visual indicia may be attributed to such an element deficiency it is difficult to isolate which elements are responsible since a number of them may be coacting to cause the changes in the plant's physical characteristics. As a result, a more sensitive and accurate indicating method than that provided by visual inspection is desired in the field of plant cultivation.

In addition to determining actual deficiencies of various elements in the plant, it may often be even more desirable to determine the manner in which a plant absorbs these elements from the soil or other similar nutrient source; and upon being absorbed, how these elements distribute themselves in the plant. From this information, optimum soil conditions for different plants at different growth stages may easily be determined and improvements in their cultivation achieved.

It is an object of this invention, therefore, to provide a clear and unequivocal method for determining the manner in which a plant absorbs and distributes various trace and other elements;

Another object of this invention is to provide a method for achieving a clear and unequivocal indication of the presence or absence of trace or other elements;

Still another object of this invention is to provide a method to indicate the amount of trace or other elements present in the sample by means of the radioactive techniques;

Yet another object of this invention is to provide a method for testing vegetable and animal matter for the presence of trace or other elements, the manner in which these elements are absorbed, as well as the manner of their distribution, by means of radioactivation techniques.

Other objects and advantages of this invention will become apparent as the description thereof proceeds.

Broadly speaking, the invention contemplates treating a sample of plant matter to cause the plant to absorb certain ones of its constituent elements under controlled conditions. The sample thus treated is then activated to produce radioactive isotopes of the elements in the plant which isotopes may then be identified by their gamma or beta spectra. By selectively activating the plant both before and after treatment and comparing the quantity and distribution of the elements, it is possible to determine the manner and rate at which the plant absorbs this element and the manner in which the element distributes itself throughout the stalk, leaves, roots, seeds, etc., of the plant.

Figure 2:
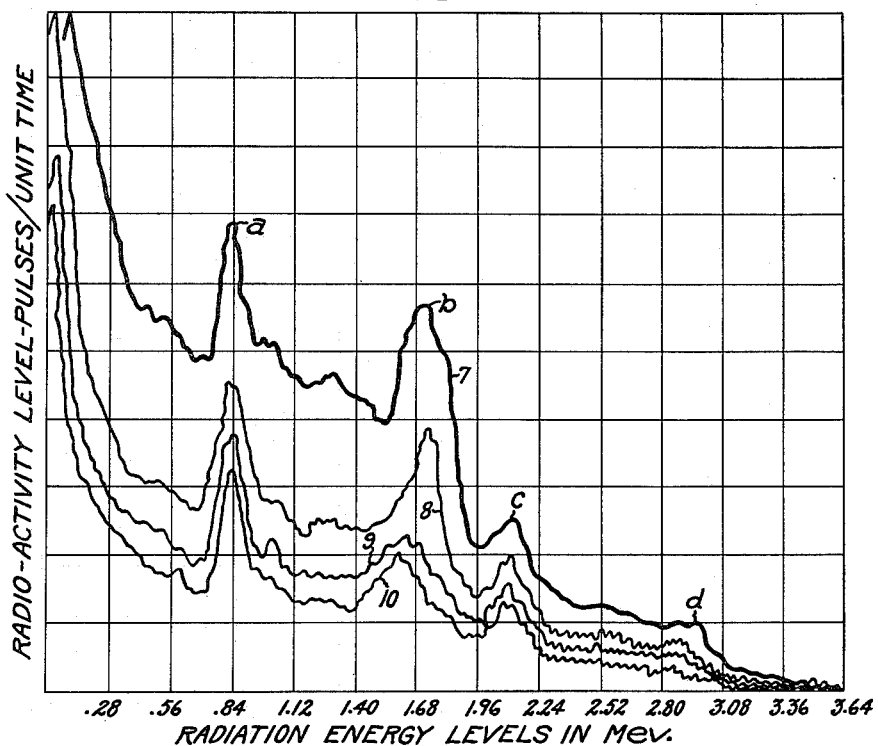

The features of this invention which are believed to be novel are set forth with particularity in the appended claims. The invention itself, however, both as to its organization and method of operation, together with further objects and advantages thereof, may best be understood by reference to the following description taken in connection with the accompanying drawings, in which:

FIGURE 1 is a block diagram of a scintillation spectrometer for determining the gamma or beta spectra of the activated material; and FIGURE 2 is a graph of isotope radiation energies plotted against the intensity of radioactivity and is useful in identifying the elements.

In order to understand the principles underlying this invention fully, it is important to be familiar with the characteristics and behavior of radioactive isotopes. Such radioactive isotopes are highly unstable and emit beta particles in decaying from one nuclear state to another and emit gamma radiations in decaying from energy level of the same nucleus to another. The beta particles and gamma radiations thus emitted have specific radiation energy levels in million electron volts, energy units commonly referred to as mev. Furthermore, the half life of each radioactive isotope is a characteristic particular to that isotope, the half life being the time required for the disintegration rate of a radioactive isotope to decrease to one half of its initial rate. These characteristics of radioactive isotopes are known and generally available through such compilations as "Nuclear Data," circular of the National Bureau of Standards 499, Department of Commerce, published September 1, 1950. It becomes evident then that if the various elements present in a plant sample can be converted to their radioactive isotopes, these isotopes and their source elements may be identified from the values of their characteristic radiation energies and half lives. One mechanism for achieving this result is by activation of the elements through bombardment by nuclear particles.

In addition to identifying the various elements in a plant test sample, the actual quantity of the various elements may also be determined in this manner. That is, at the same time that the plant sample is activated, fixed quantities of various known constituent elements of the plant are also activated to produce their radioactive isotopes. The radiation intensity of the known quantity of the reference element may then be used as a comparison standard to determine from the relative radiation intensity of the activated elements in the plant the quantity of the element contained in the plant.

In carrying out the method of the instant invention, a sample of plant matter such as a growing tomato plant, for example, is placed in a nutrient solution containing a known quantity of at least one of the constituent plant elements. One typical such nutrient solution which may be used has the following composition: 0.01 molar solution of $KNO_3$; 0.003 molar solution of $Ca(NO_3)_2$; 0.002 molar solution of $MgSO_4$; and 0.002 molar solution of $NH_4H_2PO_4$. A fixed molar solution of one of the elements, in this case manganese in the form of manganese sulfate, $Mn_2(SO_4)_3$, for example, is added to the nutrient solution as the source of the element manganese. The plant remains in the nutrient solution for 24 hours, or any other fixed period, so that the plant absorbs a portion of the manganese from the nutrient solution including the manganese sulfate. The plant is then removed from the nutrient solution and a sample thereof is activated to convert the various elements thereof, and in particular the manganese, to radioactive isotopes of those elements.

Activation of the plant sample, which may be either the entire plant in vivo or selected portions such as leaves, stalks, or fruit, may be achieved in various manners known to those skilled in the art. For example, the plant may be subjected to a thermal neutron flux while bombardment by proton, deutron, or alpha particles is equally feasible. However, the preferred method is to place a test sample in a reactor neutron flux, subjecting the material to bombardment by thermal neutrons causing the element in the sample to form radioactive isotopes. The activated sample is then analyzed in a scintillation spectrometer to indicate the gamma or beta spectra of the activated elements, which spectra are useful in identifying the elements present since, as pointed out above, each of these isotopes has distinct, identifiable radiation energies both for beta and gamma radiations. Furthermore, the intensity of this radiation provides an indication of the quantity of the element present when compared to the intensity of the radiation produced by the known quantity of the activated reference sample.

In order to provide an even more accurate indication of the absorption mechanism of the plant, it may be desirable to activate the plant sample, or a portion thereof, at different times. That is, by activating the plant sample to determine the intensity and distribution of the constituent elements both before and after applying the nutrient solution, any change in the quantity and distribution of the element in the plant provides a clear cut indication of the manner in which the period of its immersion therein. In this manner, much valuable information may be gathered about the manner and rate at which a given plant can absorb these various elements and furthermore, the manner in which a given element distributes itself throughout the plant during the course of its absorption from the nutrient solution, and correspondingly from any soil in which the plant is growing.

Referring now to FIGURE 1, there is illustrated in block diagram form a scintillation spectrometer which may be utilized to determine the gamma and beta radiation spectrum of the plant sample in order to determine the presence, distribution, and quantity of the various constituent elements of the plant. The scintillation spectrometer comprises a scintillation detector 1 which includes a gamma ray sensitive fluorescent crystal such as sodium iodide, or an anthracene crystal where beta particles are to be detected, and a radiation sensitive device such as a photomultiplier. The sodium iodide crystal transposes gamma radiations into blue light flashes, which light flashes are detected by the photomultiplier to produce output voltage pulses proportional to the energy of the gamma radiation. Such scintillation detectors are old and well known in the art and reference is hereby made to Nuclear Reactors for Industry and Universities—Wakefield—Instruments Publishing Company, Pittsburgh, Pennsylvania (1954), Chapters 3 and 6, for showing a description of such a scintillation detector.

The output of the scintillation detector 1 is fed to a preamplifier 2 and subsequently to a linear pulse amplifier 3 to produce signals of a magnitude suitable for analyzing, for the output of the scintillation detector is of extremely low amplitude. The amplified voltages are applied to a differential pulse heighth selector which determines the number of pulses of differing amplitudes occuring per unit time. That is, the pulses are segregated according to their amplitude and are counted according to frequency of occurrence. The pulses in each such channel are then fed to a counting rate meter 5 which drives a recorder 6 to produce a plot of output counting rate versus pulse amplitude. The amplitudes of the individual pulses represent the radiation energy level of the gamma rays, and the axis of any graph representing pulse amplitude may thus be calibrated directly in energy level in m.e.v. The counting rate in pulses per unit time of a given amplitude represents the rate of radioactivity of the isotope and is thus useful in determining the quantity of the element present as well as the half life of the isotope.

In order to determine the half lives of the individual radioactive isotopes as an additional identification mechanism for these isotopes, the radiation spectrum analysis of the plant sample is repeated at specified spaced time intervals $T_1$, $T_2$, $T_3$, $T_4$, etc., in order to determine the rate at which the radioactivity decays. The pulse counting rate at the subsequent times are reduced in value as a direct function of disintegration rate of the radioactive elements. Since the time periods at which such subsequent analyses are made are known, it is possible to determine the time required for disintegration to decrease to one half of its initial rate, and the half lives of the elements may thus be determined to provide an additional check on the identity of these elements.

Referring now to FIGURE 2, a typical gamma spectrum of the radioactive sample is illustrated graphically and shows the relationship between the radiation energy level of the gamma rays in m.e.v. along the abscissa and the counting rate of the pulses in pulses per unit time along the ordinate. Curve 7 is a graph of the gamma energy distribution of radioactive sample of plant matter taken at time $T_1$ while curves 8, 9 and 10 are similar gamma energy distribution curves at times $T_2$, $T_3$, and $T_4$. Returning now to curve 7, it can be seen that gamma energy peaks occur at points labelled A, B, C and D which represent radiation energy levels of .845 m.e.v., 1.75 m.e.v., 2.11 m.e.v. and 2.89 m.e.v. With the aid of compiled data such as the previously referred to publication "Nuclear Data," it is possible to determine which elements are thus present in the sample. For example, "Nuclear Data" indicates that the isotope manganese 56 in decaying to a lower energy state of the same nucleus emits three types of gamma radiation. It emits gamma energy at 2.13 m.e.v., 1.81 m.e.v., and at .845 m.e.v. Thus, points A, B, and C of curve 7 indicate that the stable isotope manganese 55 was originally present in the vegetable matter which isotope was transformed to the radioactive isotope manganese 56 represented by the points A, B and C. By thus activating the plant sample and subsequently detecting the radiation spectrum of the activated element in the sample as illustrated in FIGURES 1 and 2, the elements present in the sample may be easily identified. Curves 8, 9 and 10 have gamma energy peaks, energies in m.e.v. however, these peaks occurring at succeedingly lower amplitudes which represent successively lower pulse counting rates and hence the disintegration rate of the radioactive isotopes with time. Since the time $T_1$, $T_2$, $T_3$, and $T_4$ are known, it is possible to determine time required for disintegration rate to decrease to one half of its initial rate, and thus determining the half life of the isotope. Since this half life is a constant characteristic of the particular isotope, by this means it is possible to identify the unknown element by means of this additional characteristic, since the half lives for various isotopes have experimentally been determined and may be found in the above identified "Nuclear Data."

Furthermore, the actual quantity of the manganese found in the plant sample may be determined by comparing the intensity of the radiations in pulses per unit time with the corresponding intensity of the reference sample. That is, since the rate at which both the reference sample and the plant sample isotopes decay is known and since the time at which the radiation measurement is taken relative to the time at which the reference samples and the plant sample were activated, it is possible to compensate for the decay in the activity of both samples and a clear cut indication of the relative quantity of the element determined.

The element represented by the gamma energy peak at point B of the curve may be found in a manner similar to that by which the element represented by the points A, B, and C of the curve was determined. It should be pointed out also that the curves of FIGURE 2 are simplified for the sake of clarity, that in actuality many more gamma energy peaks representing many more elements would be present.

It will also be apparent to those skilled in the art that in addition to determining how much of the element manganese contained in nutrient solution was absorbed by the plant specimen, it is also possible to determine the manner in which the manganese distributes itself throughout the plant. That is, by taking different portions of the plant and measuring the relative quantities of manganese deposited there from the nutrient solution, it is possible to determine the distribution characteristics of the particular element throughout the plant. That is, by obtaining a leaf sample, a sample of stalk, a sample of tomato fruit, and even a sample of the seed in the fruit, and activating the individual element and then taking their gamma spectra it is possible to determine what if any distribution pattern exists for the given plant under the given condition.

In addition to using a nutrient solution which contains the element manganese in the form of manganese sulfate, $Mn_2(SO_4)_3$, it is of course obvious that the plant may be treated by the administration of a nutrient solution containing other elements. Thus, for example, if phosphorous is added it may be added to the nutrient solution in the form of disodium hydrogen phosphate, $Na_2HPO_4$. Similarly, any other elements such as boron, iron, molybdenum, etc., may be added to the nutrient solution as desired in order to treat the plant in the desired manner. In addition, a plurality of elements may be dissolved in the nutrient solution and the plant thus treated.

Once, it is determined, from the novel method described above, which of the elements are present, the quantity present, the ability of the plant to absorb these elements, and the manner in which these elements are distributed throughout the plant, it is possible to diagnose, among other things, any food deficiencies from which the plant is suffering. Furthermore, information may be elucidated which is most helpful in determining at which stage of the plant's growth its mechanism is most efficient in absorbing and distributing the various element.

While a particular embodiment of the invention has been shown, it will, of course, be understood that it is not limited thereto since many modifications of the method utilized may be made. It is contemplated by the appended claims to cover any such modifications as fall within the true spirit and scope of this invention.

What I claim as new and desire to secure by Letters Patent of the United States is:

1. In a method for determining plant element characteristics without destroying the plant, the steps comprising radioactivating a plant to produce radioactive isotopes of the constituent elements, determining radiation characteristics of all the isotopes present by employing a pulse height analyzer means, administering a nutrient solution including at least one of a normal constituent plant element in a non-radioactive form to the plant under controlled conditions, removing the plant from the nutrient solution, radioactivating the plant in vivo and determining radiation characteristics of all isotopes present including any newly formed isotopes by employing the pulse height analyzer means, repeating the step of determining the radiation characteristics of all isotopes present at several specified spaced time intervals to determine the half lives of all isotopes present thereby positively identifying all isotopes present, and comparing the several determinations of the radiation characteristics of all isotopes present to determine the manner in which the plant absorbs and distributes the normal constituent plant element in said solution.

2. In a method for determining the presence, absorption and distribution of elements of plant matter, the steps of radioactivating plant matter, obtaining a radiation spectrum analysis to determine the presence and distribution of the elements of the plant matter by identification of resultant radioactive isotopes, administering a nutrient solution to the plant matter for a determinable period of time to permit absorption of the solution by the plant, said solution containing at least one of a normal constituent plant element in a non-radioactive form, removing the plant from the nutrient solution, radioactivating the plant matter after removal from said nutrient solution, obtaining radiation spectrum analyses at several predetermined spaced time intervals to determine half lives of the individual radioactive isotopes thereby positively identifying individual radioactive isotopes and determining the presence and distribution of the elements of the plant matter at the predetermined time intervals, and comparing the several determinations of the presence and distribution of the elements to determine the manner in which the plant absorbs and distributes the normal constituent plant element in said solution.

3. The method set forth in claim 2 wherein the steps of obtaining radiation spectrum analyses comprises analyzing specific radiation energy levels of the radioactive isotopes with a pulse height analyzer means that segregates electrical pulse signals according to their amplitude and counting the rate of occurrence of the electrical pulse signals according to their amplitude.

References Cited in the file of this patent

UNITED STATES PATENTS

| Re. 24,383 | McKay | Oct. 29, 1957 |
| 2,303,688 | Fearon | Dec. 1, 1942 |
| 2,744,199 | Juterbock et al. | May 1, 1956 |
| 2,760,079 | Arps | Aug. 21, 1956 |

FOREIGN PATENTS

| 724,441 | Great Britain | Feb. 23, 1955 |

OTHER REFERENCES

The Determination of Sub-Microgram Quantities of Arsenic in Biological Matter, Part III by Smales et al., Analyst, vol. 77 (1952), pages 196 to 202.

Biological Applications of Tritium, by Thompson, Nucleonics, vol. 12, No. 9, September 1954, pages 31 to 35.

International Conference on Peaceful Uses of Atomic Energy, vol. 15, pages 73 to 80, The United Nations Press, August 1955.

International Conference on Peaceful Uses of Atomic Energy, United Nations Press, 1956; volume 16, pages 114 to 120, by Kurzanov; volume 12, pages 3 to 9, by Kurzanov.